No. 812,971. PATENTED FEB. 20, 1906.
F. C. ADAMS.
PROCESS OF TREATING RAISINS TO REMOVE THE CAP STEMS.
APPLICATION FILED APR. 20, 1903.
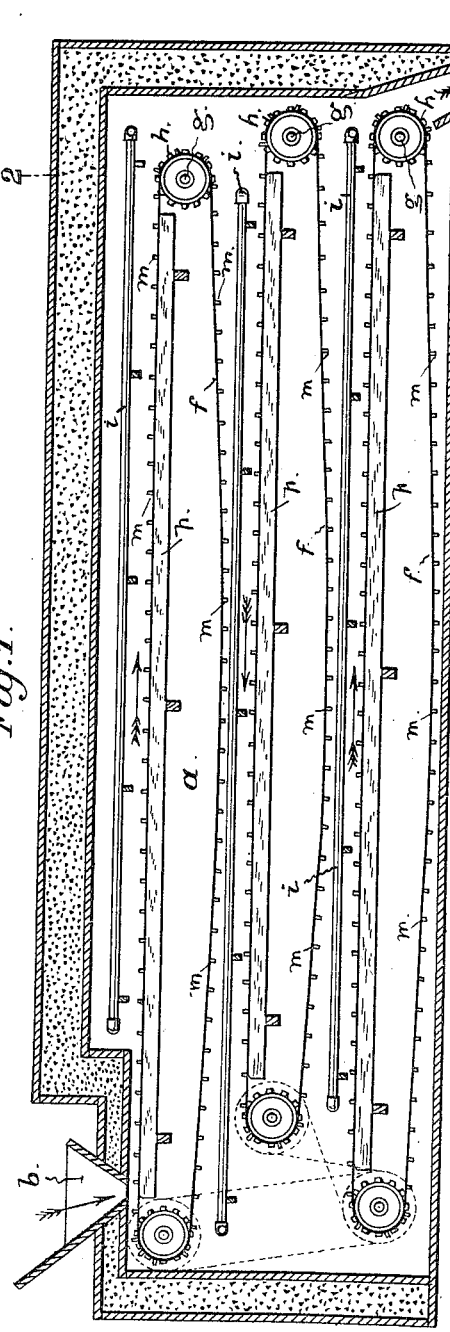
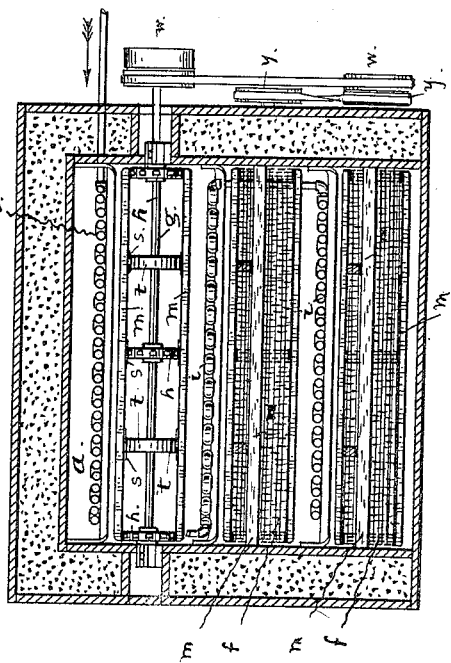
Witnesses.
Inventor.

UNITED STATES PATENT OFFICE.

FRANK COLUMBUS ADAMS, OF FRESNO, CALIFORNIA, ASSIGNOR OF ONE-HALF TO JOHN M. SEROPIAN AND GEORGE M. SEROPIAN, OF FRESNO, CALIFORNIA.

PROCESS OF TREATING RAISINS TO REMOVE THE CAP-STEMS.

No. 812,971.      Specification of Letters Patent.      Patented Feb. 20, 1906.

Application filed April 20, 1903. Serial No. 153,406.

*To all whom it may concern:*

Be it known that I, FRANK COLUMBUS ADAMS, a citizen of the United States, residing in Fresno City, in the county of Fresno, and State of California, have invented and discovered a new and useful Process of Treating Raisins to Remove the Cap-Stems, of which the following is a specification.

This invention relates to improvements made in treating raisins to remove the cap-stems and to facilitate and simplify the steps and operations of preparing raisins for the market.

The invention is based on the discovery I have made that by subjecting raisins to a low temperature for a proper period of time the cap-stems will become shriveled and loosened to such a degree that they will readily separate from the raisins and can be removed without affecting the integrity of the skin or the appearance of the fruit. In addition to this the application of a temperature sufficiently low for the desired purpose has the effect to simplify the process of cap-stemming raisins by enabling the manufacturer to dispense with several steps or operations that are at the present time necessarily employed to remove the cap-stems.

Heretofore, so far as I am aware, it has been the practice to remove the cap-stems by the application of heat, in which the raisins are exposed to a temperature sufficiently high to render the cap-stems brittle or put them in such a condition that they will readily separate from the fruit when run through the cap-stemmer. At the end of the heating operation it will be obvious that the raisins being exposed to a high temperature are also affected, to a certain extent, by the heat and with greater or less danger of detracting from or reducing the quality or the character of the product by the use of a too high degree of heat. The application of heat for this purpose also has the disadvantage and objectionable feature of increasing the labor of handling the fruit and of consuming considerable time and expense in labor in restoring the stemmed raisins to normal temperature before packing and especially of adding to the initial expense in setting up the plant.

As an improvement on the processes or operations heretofore employed and practiced in the treatment of raisins my said invention consists, essentially, in subjecting or exposing raisins to a low temperature prior to the removal of the cap-stems, as hereinafter more particularly described and set forth in the claim at the end of this specification.

The following description explains at length the nature of my said invention and the manner in which I proceed to apply, carry out, and practice the same, and in connection herewith I represent in the accompanying drawings and proceed to describe a construction of apparatus devised by me and well adapted for treating raisins according to my said process.

In the said drawings, Figure 1 is an elevation of the apparatus principally in longitudinal section. Fig. 2 is an end elevation principally in transverse section.

In carrying out my said invention I expose the raisins to a low temperature for a length of time sufficient to effect the desired end—namely, to render the cap-stems brittle and readily separable from the fruit—by passing the raisins through a closed chamber or compartment in which the required degrees of cold are maintained during the operation. Ordinarily a temperature of from 10° to 20° above zero, Fahrenheit, will produce the desired results.

To carry or move the fruit through such an atmosphere of cold, I spread it on an endless belt or apron, which is caused to travel at a slow rate of motion through the inclosing chamber, so as to expose the raisins to the cold atmosphere for a longer or shorter period of time, according to the speed at which the carrier moves. I have obtained satisfactory results in exposing the fruit to the cold atmosphere for a period of between fifteen and thirty minutes. After the fruit has been cooled to the proper degree it is immediately subjected to the cap-stemming operations while still in its cooled condition.

A low temperature is produced in the chamber by means of coils of pipe carrying a refrigerant, such as is used for cold-storage rooms or in the well-known ice-making machines, the pipes being laid through the chamber from the outside in rows, coils, or layers placed at intervals apart with the aprons arranged to travel between the rows or coils. This is an effective and also a practical way of maintaining a proper degree of cold in the chamber and for subjecting the raisins thereto with a minimum expenditure of time and labor.

In the apparatus illustrated in the drawings the chamber $a$ has an inlet $b$ at the top for introducing the raisins and an outlet $d$ at the bottom with a discharge-spout $e$, arranged to deliver to a cap-stemming apparatus E, of any desired construction. Between these two apertures a number of carriers formed of endless belts or aprons $f$ are arranged one below another at intervals apart alternately with the refrigerating-pipes $i$, with such variation in length one with another that the top apron, which is at one end directly under the inlet $b$, will discharge at the opposite end directly upon the adjacent end of the apron next below, while the opposite end of the second apron will discharge upon the corresponding end of the third apron, and so on throughout the whole set or series of traveling carriers. Shafts $g$, carrying sprocket-wheels $h$ and extending at one end through the sides of the chamber, give motion to the carriers, which are formed of wire screens and chain belts $k$ with cross-floats or slats $m$, secured to them at intervals apart. These are arranged to travel upon the top of the stationary bars $p$, which are placed at intervals apart transversely under the chain belts. Additional belts formed of endless bands $s$ and carried by pulleys $t$ on the sprocket-wheel shafts serve to support the apron between the chain belts.

Power is applied to the sprocket-wheel shaft by pulleys $w y$ on the outside of the chamber and belts connecting them with a power-shaft.

The chamber has double walls with the space filled with a non-conducting material, such as sawdust. An apparatus of this description enables a considerable quantity of raisins to treated by my said process in a continuous manner and without loss of time.

Having thus described my invention, what I claim as new therein, and desire to secure by Letters Patent, is—

The improvement in the art of treating raisins to remove the cap-stems, which consists in subjecting the raisins to a low temperature (approximately 10° to 20° Farhenheit) and then immediately removing the cap-stems while the raisins are in a cooled condition, substantially as described.

In testimony whereof I have signed my name in the presence of two subscribing witnesses.

FRANK COLUMBUS ADAMS.

Witnesses:
    LAZAR POPOVICH,
    W. C. MARSHALL.